United States Patent Office 3,040,154
Patented June 19, 1962

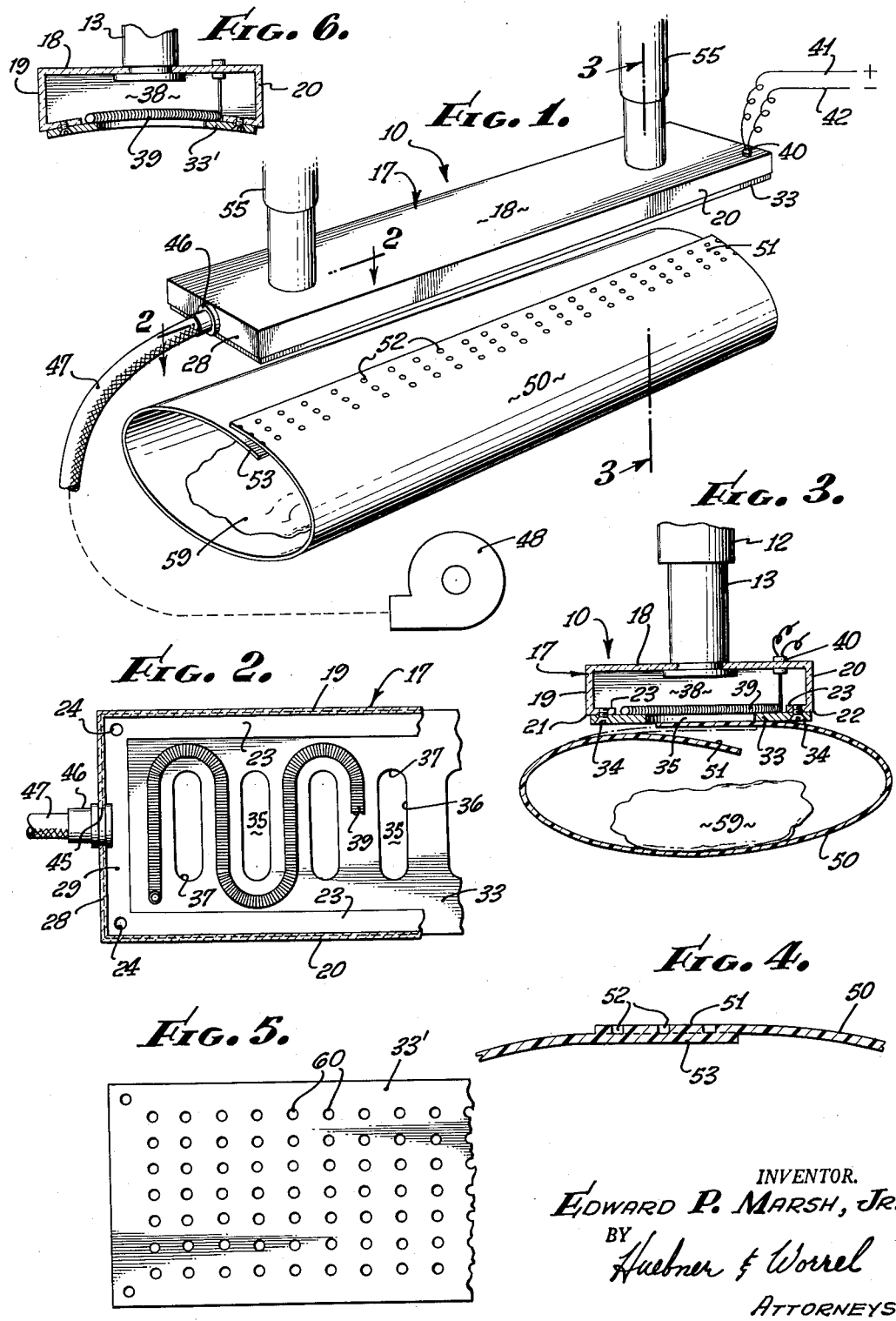

3,040,154
HEAT SEALER APPARATUS
Edward P. Marsh, Jr., Corona, Calif., assignor to
Edward P. Marsh, Sr.
Filed July 13, 1959, Ser. No. 826,522
1 Claim. (Cl. 219—19)

This invention relates to a heat sealer. More particularly, the invention relates to a new and improved heat sealing apparatus for the sealing of plastic bags, or plastic pieces that are amenable to heat.

It is an object of this invention to provide a new and improved heat sealer for plastics, i.e. bags, strips or sheets and the like.

It is also an object of this invention to provide apparatus for the sealing of plastic bags wherein the merchandise which is already in the bag will not be damaged by the sealing of the ends of the bag.

It is another object of this invention to provide a new and improved method of holding the plastic pieces to be sealed to the heat sealer during the sealing operation.

It is moreover among the objects of this invention to provide a new and improved sealing apparatus which is easy to assemble, economical to produce and easy to operate.

Other objects and purposes will appear in the following description and considered in the light of the accompanying drawing and appended claim wherein like parts are designated by reference numerals.

In the drawings:

FIGURE 1 is a perspective view of the heat sealer embodying this invention;

FIGURE 2 is a sectional view on line 2—2 of FIGURE 1;

FIGURE 3 is a sectional view on line 3—3 of FIGURE 1;

FIGURE 4 is an enlarged cross-sectional view of the position of two pieces of plastic when sealed by this invention;

FIGURE 5 is a top elevational view of a modified platen of the heat sealer; and

FIGURE 6 is a cross-sectional view of a further modified platen.

Referring more particularly to the drawings, the heat sealer is generally designated by the number 10. The heat sealer 10 is generally formed from a single sheet of material, such as steel or iron, to create a generally rectangular housing 17. This housing 17 is formed with a top portion 18, side walls 19 and 20, and end walls 28, 28. The side walls 19 and 20 are bent inwardly at 21 and 22 to form flanges 23, 23 extending the entire length of the side walls 19 and 20 and being in parallel relationship with top portion 18. The ends walls 28, 28 are bent inwardly in the same manner as side walls 21 and 22 forming flanges 29, 29. These flanges define an opening smaller than the area of the top portion 18.

The end walls 28, 28 and side walls 19 and 20 are welded or otherwise secured at the corners thereof to each other so as to form the complete housing 17.

A generally rectangular platen 33 is provided to be secured to the flanges 23, 23 and 29, 29 by means of screws 34, which pass through the platen 33 into screw receiving holes 24 in the flanges. The platen 33 is formed along its entire length with elongate openings 35 extending therethrough. These openings 35 are formed with parallel walls 36 and circular ends 37. These openings are in parallel relationship to each other and the major axis of the openings 35 extend transversely of the platen 33.

A chamber 38 is defined by top portion 18, side walls 19 and 20, end walls 28, 28 and platen 33. In the chamber 38 an electric coil heating element 39 is arranged in a zig-zag position mounted on the platen 33 between the openings 35. By placing the heating element 39 in this arrangement, the platen 33 can be heated generally evenly to create a better sealing surface. The electric heating element 39 extends from one end of the chamber 38 to the other. There is provided at one end of the top portion 18 an insulator 40 through which electrical wires 41 and 42 pass from any source of electric power to the coil heating element 39.

In one end wall 28 of the housing 17 is an opening 45 extending into the chamber 38. This opening 45 is fitted with a bushing coupling 46. The coupling 46 receives one end of a flexible hose 47 and the other end is secured to a vacuum pump 48, which is schematically illustrated in FIGURE 1 of the drawings. The pump 48 may be any of the vacuum type well known in the art.

In operation a bag 50 of plastic, that is amenable to heat, is preformed along a marginal edge 51 with a number of minute perforations 52. This edge 51 is overlapped over another marginal edge 53, as shown in FIG. 4. In this position the bag 50 is placed underneath the heat sealer 10, and the sealer is lowered by means of telescoping supports 55, 55 to a point where the platen 33 is in close proximity to the edge 51 of the bag. The vacuum pump 48 is then activated and the atmospheric pressure is reduced in the chamber 38 causing the marginal edge 51 of the bag 50 to be pulled into engagement with the platen 33 as is illustrated in FIG. 3. With the continued pumping the atmospheric pressure in the perforations 52, some of which will naturally be aligned with openings 35, will be reduced causing the marginal edge 53 to be pulled into contact with the edge 51, as best illustrated in FIG. 4.

In this position the heating element 39 is energized and the base plate 33 by induction will become hot and transmit heat to the two edges fusing them together and sealing the bag.

In the manner shown and described it will be seen that by the suction pull created through the use of the vacuum pump 48, merchandise 59 in the bag 50 will not be damaged by pressure exerted upon it because the edges will be pulled up to the platen 33 and held in that position until the vacuum pump 48 is deactivated.

FIGURE 5 of the drawings illustrates a modified form of the platen 33. In this modification the platen 33' has openings 60 which are generally circular in cross-section and are arranged either in a geometric pattern such as shown in FIGURE 5, or indiscriminately throughout the entire length of the plate. In this modification the plate 33' has more the appearance of a sieve.

FIGURE 6 illustrates a modified shape of the platen 33. In this modification the platen 33' is curved inwardly toward the chamber 38 to create other than a flat sealing surface for bags which contain irregularly shaped merchandise.

Although I have herein shown and described my invention in what I conceive to be the most practical and preferred embodiments, it is recognized that departures may be made therefrom within the scope of my invention which is not to be limited to the details disclosed herein but is to be afforded the full scope of the claim so as to embrace any and all equivalents and structures.

Having thus described the invention, what is claimed as new is:

A heat sealer comprising stationary supporting means, a housing secured to said supporting means, said housing being formed with a top portion, side walls and end walls, said side and end walls having flanges spaced from said top portion and extending inwardly from said walls, said flanges defining an opening less than the area of the top portion, a platen secured to the outside surface of said flanges closing said opening and forming a chamber in said housing, said platen being formed with a plurality of elongated parallel spaced openings extending therethrough, said openings each having parallel side walls defining an area smaller than the area of said platen between each of said openings, a continuous coil heating element mounted on the platen and arranged in undulating form thereon as seen in plan view to surround a major segment of the periphery of each of said openings, a vacuum pump secured to said housing and communicating with said chamber whereby atmospheric pressure may be reduced in said chamber to create a suction through said spaced openings of said platen for holding elements to be sealed.

References Cited in the file of this patent

UNITED STATES PATENTS

| | | |
|---|---|---|
| 2,492,908 | Von Hofe | Dec. 27, 1949 |
| 2,590,221 | Stevens | Mar. 25, 1952 |
| 2,775,677 | Schuetze | Dec. 25, 1956 |
| 2,821,612 | Schuetze | Jan. 28, 1958 |